US012424092B1

(12) United States Patent
Mardech

(10) Patent No.: US 12,424,092 B1
(45) Date of Patent: Sep. 23, 2025

(54) LIGHT SCALE SAFETY SYSTEM FOR TRAFFIC CIRCLES AND TRAFFIC ROUNDABOUTS

(71) Applicant: Saeed Mardech, Redding, CA (US)

(72) Inventor: Saeed Mardech, Redding, CA (US)

( * ) Notice: Subject to any disclaimer, the term of this patent is extended or adjusted under 35 U.S.C. 154(b) by 47 days.

(21) Appl. No.: 18/226,655

(22) Filed: Jul. 26, 2023

(51) Int. Cl.
*G08G 1/07* (2006.01)
*G08G 1/052* (2006.01)
*G08G 1/08* (2006.01)

(52) U.S. Cl.
CPC ............... *G08G 1/08* (2013.01); *G08G 1/052* (2013.01)

(58) Field of Classification Search
CPC ................................. G08G 1/08; G08G 1/052
USPC .......................................................... 340/917
See application file for complete search history.

(56) References Cited

U.S. PATENT DOCUMENTS 8,395,530 B2 3/2013 Al Hasan
10,269,243 B1 * 4/2019 Tannenbaum ..... G08G 1/09623
2020/0320869 A1 * 10/2020 Malhan .................... G08G 1/07
2022/0161799 A1 * 5/2022 Da Silva ......... B60W 30/18154
2023/0222910 A1 * 7/2023 Rainer ............ G08G 1/096725
701/414

OTHER PUBLICATIONS https://www.youtube.com/watch?v=LD5TmVc0o4E discloses a roundabout simulation dated Apr. 28, 2013, from Boboye Engineering Company: http://www.boboye.com/company/index.htm. This invention also combines a roundabout with specific vehicle lane designations and traffic lights.

* cited by examiner

*Primary Examiner* — Tai T Nguyen
(74) *Attorney, Agent, or Firm* — John P. Costello

(57) ABSTRACT

A traffic circle or roundabout having at least one sensor for sensing the presence of vehicles traveling in the lanes of a traffic circle or roundabout, the sensor capturing data on the speed and direction of a traveling vehicle. The sensor relays the vehicle speed and direction data to a computer which is in communication with a light array embedded in a circular curb of a center island of the roundabout or traffic circle. The light array illuminates a portion of itself in front of a traveling vehicle, the length of the light array illuminated being scaled to show a lengthier illumination for high-speed vehicles and a shorter illumination for average or slow-speed vehicles.

10 Claims, 8 Drawing Sheets

LIGHT SCALE SAFETY SYSTEM FOR TRAFFIC CIRCLES AND TRAFFIC ROUNDABOUTS

CROSS-REFERENCE TO RELATED APPLICATIONS

Not Applicable.

BACKGROUND OF THE DISCLOSURE

Technical Field of the Disclosure

This invention relates to suburban traffic roundabouts or traffic circles and, more specifically, to an improved suburban traffic roundabout or traffic circle which employes a moving light scale, the light scale indicating the speed and direction of oncoming vehicles traveling within the roundabout or traffic circle.

Description of the Related Art

Traffic roundabouts and circles have been in use for decades as a tool for regulating the flow of cross-traffic. At standard traffic intersections, traffic lights signal when traffic coming from one direction must stop and allow traffic traveling from an opposite direction to go. With the typical "stop-go" intersection employing traffic lights, one set of vehicles must always stop and wait while another set of vehicles goes. This interaction is less efficient than the traffic roundabouts or circles which allows traffic from several directions to merge and continue to travel together. Roundabouts and traffic circles thus avoid the time and fuel wastage of the stop-go model of the typical lighted traffic intersection.

There have been inventions which combine traffic roundabouts with traffic lights. U.S. Pat. No. 8,395,530, issued to Al-Hasan on Mar. 12, 2013, discloses traffic lights positioned at a corner of each intersection of a roundabout. Each traffic light has a stop-and-go indicator and a pair of directional indicators for directing traffic. However, this invention does not sense or rely on information from the cars in the roundabout itself.

A publicly available video cited in the applicant's information disclosure statement discloses a roundabout simulation dated Apr. 28, 2013, from Boboye Engineering Company. This invention also combines a roundabout with specific vehicle lane designations and traffic lights.

The drawback with current roundabout systems which employ traffic lights is that drivers entering the roundabout must still rely on the traffic lights informing them whether to enter the roundabout or not, rather than focusing their attention on oncoming vehicles to determine if entering the roundabout is safe or not. Also, the present traffic-lighted systems do not give a driver attempting to enter a roundabout any information on the speed and direction of an oncoming vehicle.

None of the prior art examples known to the inventor employ sensors which gauge the speed of oncoming vehicles to thereby allow a driver entering a roundabout or traffic circle to decide if it is safe to enter. It is believed that a much safer suburban roundabout or traffic circle can be created if roundabout systems sense the speed of vehicles inside of the roundabout and employ a moving visual, such as a moving light scale, to aid other drivers in deciding whether to enter a roundabout.

SUMMARY OF THE DISCLOSURE

The invention focuses upon small suburban traffic roundabouts that generally have two lanes, an inside lane and an outside lane. In these types of roundabouts, the level of traffic is such that drivers approaching the roundabout need only focus upon one or two oncoming vehicles. The two-lane design necessarily limits the number of oncoming vehicles approaching a driver attempting to enter the roundabout. These type of small roundabouts are fed by connecting roads at the North, South, East and West points of the roundabout, these "feeder roads" insuring that traffic enters and leaves the roundabout from four directions. Vehicles can enter from one direction and leave the roundabout from a second direction. A circular center island occupies the innermost area of the typical roundabout and generally has a curb so that vehicles do not inadvertently drive onto the center island, which is often grassy or landscaped, to give the roundabout an attractive appearance.

One objective of roundabouts is to keep vehicle traffic flowing with as little stop and go action as possible. As noted in the discussion of prior art herein, one way to control traffic using a roundabout is to employ traffic lights, which can often slow down or stop vehicles, and this defeats the purpose of a roundabout to create a continuous flow of vehicles as much as possible. Typically, rather than traffic lights, yield signs greet drivers trying to enter the roundabout, yield signs putting the responsibility on the driver to decide whether entering the roundabout is safe or not and whether it is necessary to stop or not.

The invention comprises at least one sensor for sensing the presence of vehicles traveling in the lanes of a roundabout, the sensor capturing data on the speed and direction of travel of a vehicle. The great majority of cars all travel in the same required direction in the roundabout, however, if a vehicle travels in the wrong direction (e.g. other than the required direction), the sensor will note the speed and direction of wrongfully traveling vehicles as well. The sensor can be a single sensor, but the invention works best if a plurality of sensors is arranged in locations advantageous for tracking speed and directional information of vehicles. The sensor or plurality of sensors are in communication with a computer which takes the vehicle speed and directional data into account and converts the data into electronic signals which illuminate a light array. The light array travels with the moving vehicle, and in front of the moving vehicle.

The light array may illuminate in a cautionary light color, such as yellow or orange, which are highly visible colors that are easily visible by a driver positioned to enter the roundabout. The light array also travels with the vehicle in the roundabout, the speed of travel of the light matching that of the approaching vehicle. The computer is programmed to enhance or reduce the length of the light array that is illuminated in front of a moving vehicle depending on the speed of an approaching vehicle. A vehicle that is traveling the speed limit, or slower, will have a small portion of the light array illuminated in front of it. This way a driver attempting to enter the roundabout will see only a small light illuminated in front of the approaching vehicle, indicating that the vehicle is traveling at the speed limit or close thereto, signaling that a driver may safely enter the roundabout and even safely merge in front of the approaching vehicle. If, alternatively, a vehicle is traveling within the roundabout at high speed, the computer will illuminate a great length of the light array in front of the speeding vehicle, thus indicating to a driver attempting to enter the roundabout, that waiting for the speeding vehicle to pass might be the more prudent decision.

The circular center island of any roundabout typically is bordered by a curb so as to provide a barrier between the inside roundabout lane and the center island. In one embodiment, the curb can be employed as the light array to create a lighted curb that travels with the vehicles in the roundabout lanes. A driver attempting to enter the roundabout can clearly focus upon the light traveling around the curb in front of an approaching vehicle and determine if it is safe to enter the roundabout based upon the length of the traveling light which is longer or shorter depending upon the speed of the vehicle traveling in the roundabout. This longer or shorter illumination of the light array allows the light array to act as a scale moving along with an approaching vehicle, the scale indicating both speed and direction of the approaching vehicle.

It is one object of the invention, to use the vehicle traveling in the roundabout as the determining factor for the action of the traveling light scale; in essence the light array surrounding the roundabout is the "slave", the vehicle being the "master".

It is another object of the invention, to provide a light traveling in front of an approaching vehicle in the roundabout to act as a scale for determining the margin of safety present to a driver contemplating entering the roundabout.

These and other objects and features of the present invention are described with specificity so as to make the present invention understandable to one of ordinary skill in the art.

DETAILED DESCRIPTION OF THE PREFERRED EMBODIMENT

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the terms "about" or "around" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas" "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

The present invention applies to both traffic circles and roundabouts and is especially applicable to small suburban traffic circles and roundabouts that have an inside lane and an outside lane surrounding a circular center island.

Figure 1:
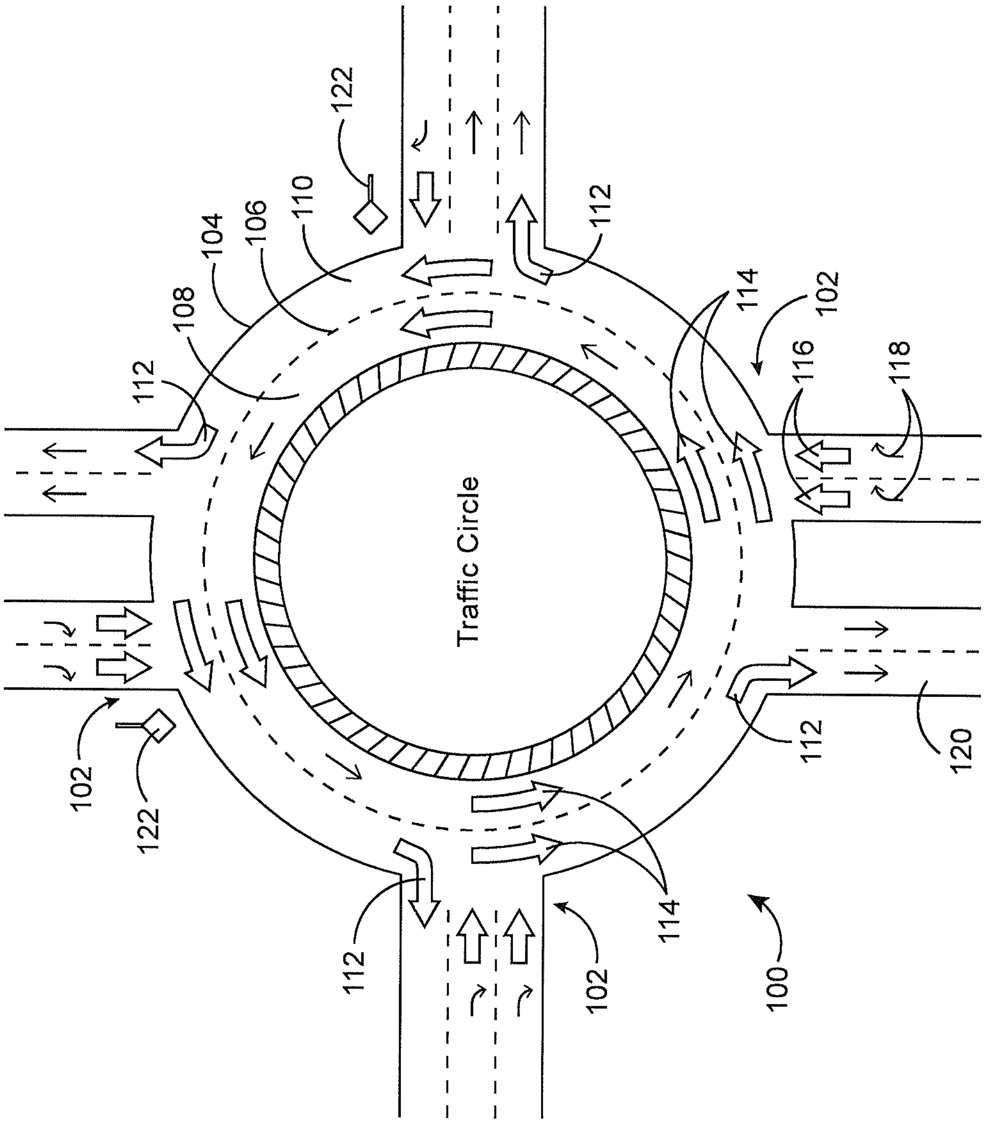
FIG. 1 PRIOR ART
FIG. 1 is a plan view of a prior art traffic circle.

Referring to FIG. 1, a prior art traffic circle 100 is presented as they are generally designed in most suburban locations. As shown, a traffic circle 100 is a series of "T" intersections 102 with a circle road 104, wherein each "T" intersection 102 may be controlled differently. The circle road is striped concentrically 106, like a "bulls-eye" separating the circle road 104 into an inside lane 108 and an outside lane 110. Vehicles in the inside lane 108 must change lanes to the outside lane 110 in order to exit the circle road 104. Exiting the circle is always a "turn" movement, arrow 112, but drivers may continue to circulate, arrow 114, regardless of which lane they are in. It is permitted to enter traffic circle 100, from feeder road 116, and merge with circulating traffic 114 by turning right 118 off of feeder road 116. Exit road 120 allows traffic to exit the traffic circle 100 by turning right 112 onto exit road 120. A traffic circle 100 may be large, with traveling speeds rarely less than 30 mph and entry is usually controlled by stop signs 122, sometimes yield signs. Traffic circles have low capacity and are less efficient than roundabouts due to the use of stop signs which create a stop-go flow to traffic rather than a merging flow of traffic.

Figure 2:
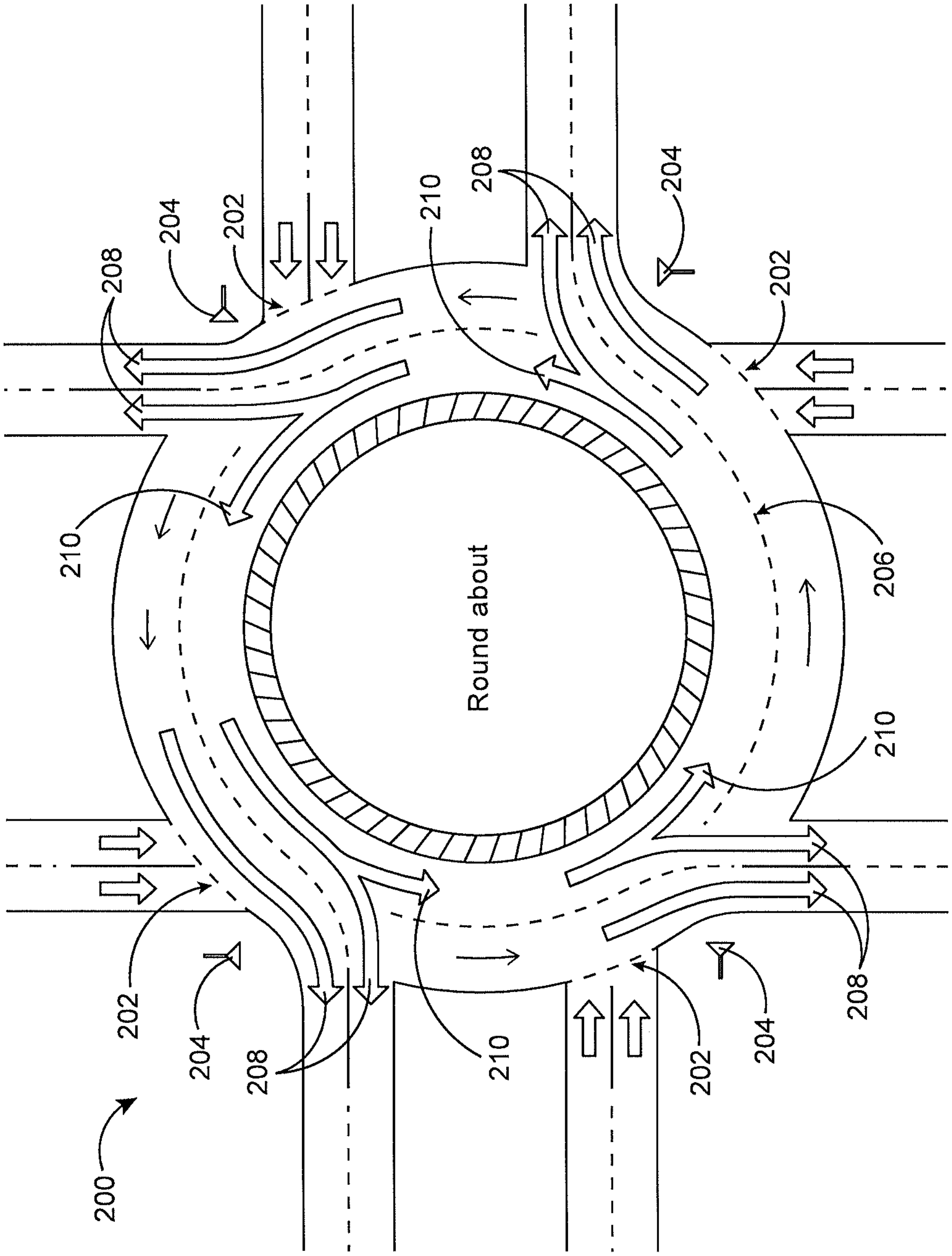
FIG. 2 PRIOR ART
FIG. 2 is a plan view of a prior art traffic roundabout.

Referring to FIG. 2, a prior art roundabout 200 is presented as it would be generally designed in most suburban locations. The roundabout 200 is a series of "crossing intersections" 202 where the entering traffic is controlled by yield signs 204. The roundabout is striped 206 as a spiral and vehicles (not shown in this view) can exit the roundabout from either exit road 208 (see exiting arrows) and therefore changing lanes is not necessary. Exiting the roundabout is a "straight ahead" movement and staying in the roundabout is a series of left turns 210 (see arrows). Entering traffic must always yield to all traffic in the roundabout regardless of which lane they are in, just like crossing a one-way road. A roundabout is generally small, where speeds rarely exceed 25 mph and they are able to handle large volumes of traffic efficiently due to employing a merging flow of traffic, rather than a stop-go flow, as is the case with traffic circles.

Figure 3:
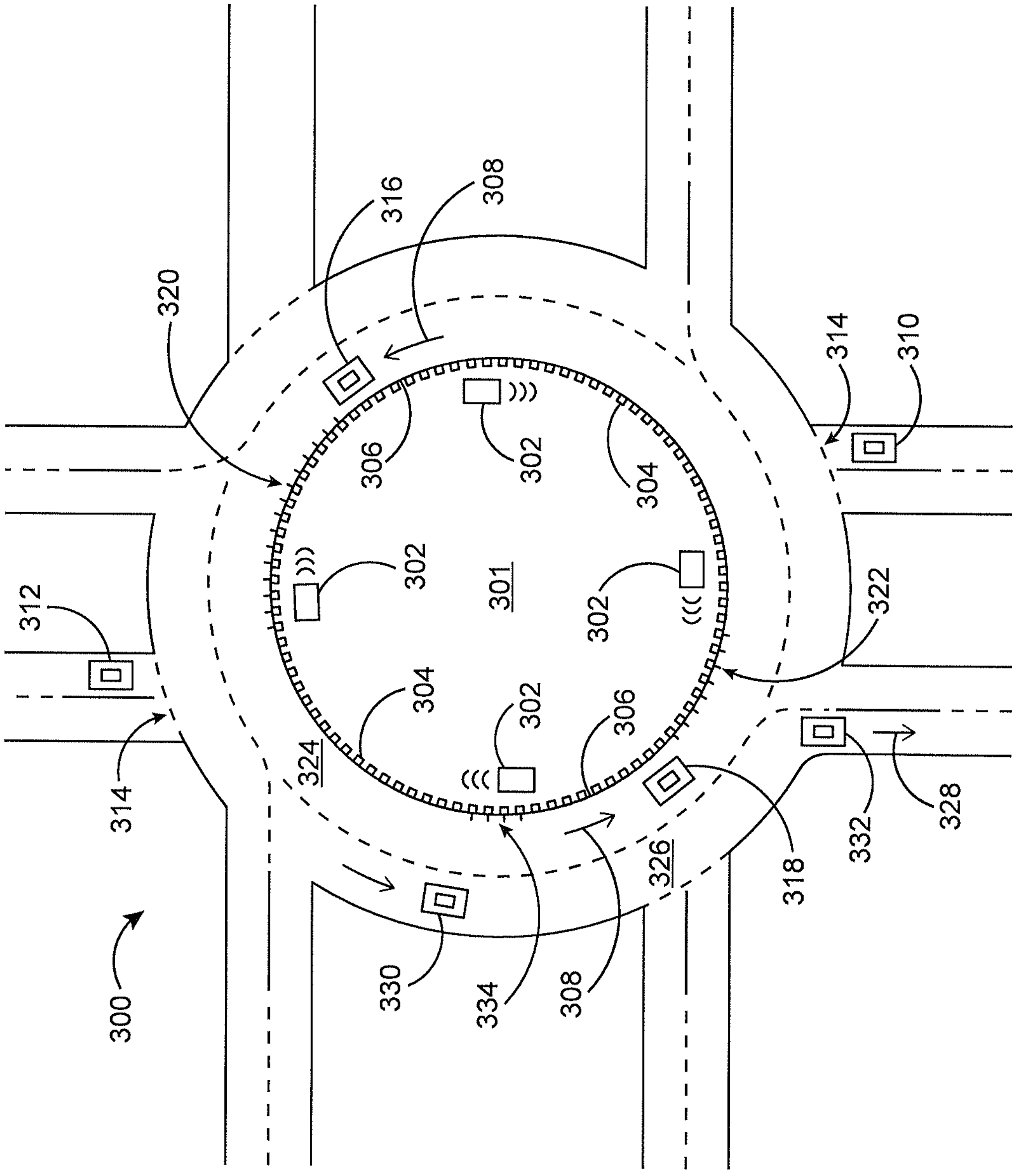
FIG. 3 is a plan view of a traffic roundabout in accordance with the invention.

With the design of and traffic flow patterns taught in FIGS. 1 and 2 in mind, we turn to FIG. 3, showing a traffic roundabout 300 in accordance with the invention. Center island 301 is equipped with a sensor array 302, in this case, the sensor array 302 is a plurality of radar devices arranged strategically around the center island so no radar gaps exist, providing full coverage. Such radar or LIDAR devices are already common in suburban neighborhoods, typically these are towed devices which provide oncoming drivers information on their vehicle's speed. Law enforcement or road departments place these devices next to roads in areas where speeding is prevalent. These devices record speed data and transmit an oncoming vehicle's speed on a large screen, sometimes along with messages such as "Slow Down You Are Exceeding the Posted Speed Limit" or similar messages. Ideally, the driver will read the message and slow his vehicle if he is speeding. In accordance with the invention, the elements of sensor array 302 are stationarily positioned on the center island 301 to provide coverage of both lanes of the roundabout 300. The speed information detected by sensor array 302 would be interpreted by a computer and converted to electronic signals used to light an array of lights 304 aligned along curb 306 of the center island 301. The light array 304 would follow around the entire curb 306 of center island 301. Light array 304 is preferably embedded in curb 306 behind heavy duty glass or plexi-glass to protect the light array 304 from vehicles contacting or driving over the curb 306. Access panels (not shown) can be provided to change out any portion of light array that become damaged or non-functional. Light array 304 is preferably comprised of LED lighting, as this has been found to be a reliable and long-lasting lighting technology.

Still referring to FIG. 3, directional arrows 308 indicate that vehicles are traveling around roundabout 300 in a continuous left-hand turn which is a common directional setup for roundabouts or traffic circles. Vehicles 310 and 312 are positioned at crossing intersections 314, waiting to join the flow of vehicles traveling around roundabout 300. Drivers of vehicles 310 and 312 must look to their left to see oncoming vehicles and determine if it is safe to enter the roundabout. As vehicles approach, the drivers in vehicles 310 and 312 can see curb 306 with light array 304 in their immediate line of sight as they look left. Approaching vehicles 316 and 318 are traveling at different rates of speed which is sensed by sensor array 302. Sensor array 302 transmits vehicle speed data to a computer (not seen in this view) which determines how many lights to illuminate in light array 304 and which portions of light array to illuminate. The invention only lights the portion of light array 304 in front of an approaching vehicle and as a vehicle travels around roundabout 300. The vehicle travels from sensor 302 to sensor 302 the computer continuing to track the vehicle as it travels inside the roundabout and between sensors of sensor array. The light array illuminates in front of the vehicle in a moving pattern as long as the vehicle remains in the roundabout. In this way, it is the vehicle which determines the action of the lights. The illuminated light array in front of the vehicle acts as a scale indicating speed and direction of an approaching vehicle.

Vehicle 316 has the longest portion 320 of light array 304 illuminated in front of it (lines emanating outward from light array 304 indicate illumination). The illumination of such a large portion 320 of light array 304 indicates that vehicle 316 is traveling at a high rate of speed, that would potentially cause a danger to vehicle 312 that is attempting to join the roundabout 300. In looking left, the driver of vehicle 312 would notice the lengthy illuminated portion 320 of light array 304 in front of vehicle 316, giving an immediate indicator of the speed and danger presented by vehicle 316. The unsafe condition posed by vehicle 316 would motivate the driver of vehicle 312 to let vehicle 316 pass by before entering the roundabout.

Still referring to FIG. 3, vehicle 310 is also waiting to join roundabout 300, as was the case with vehicle 312, and the driver of vehicle 310 would likewise look left prior entering to determine the safety risk posed by oncoming vehicles. In this case the driver of vehicle 310 sees vehicle 318 approaching. Vehicle 318 is approaching at a safe speed, perhaps 25 miles per hour in a typical roundabout. The driver of vehicle 310 notices a portion 322 of illuminated light array 304 traveling in front of vehicle 318. Vehicle 318 is traveling at a safe rate of speed, so illuminated portion 322 is much shorter than portion 320 traveling in front of high-speed vehicle 316. Portion 322 indicates that vehicle 318 is traveling at a safer and slower rate of speed than was discussed for vehicle 316. This information gives the driver of vehicle 310 reassurance that it is safe to enter roundabout 300 despite vehicle 318 approaching.

In FIG. 3, vehicles 316 and 318 were those traveling in the inside lane 324 of roundabout 300. Inside lane 324 is where vehicles may continue to travel until they are ready to move into the outside lane 326 and use exit road 328 to exit the roundabout 300. In the normal course of safe driving within roundabout 300, vehicle 330 traveling in outside lane 326 should use the upcoming exit road 328 where vehicle 332 is exiting. However, as is often the case, vehicles will loiter in the outside lane 326 rather than efficiently exit the roundabout 300 and vehicle 310 waiting to enter roundabout 300 at intersections 314 must also watch for outside lane vehicles such as 330. Sensors 302 would track outside lane vehicle 330 and illuminate a portion 334 of light array 304 moving in front of vehicle 330. If vehicle 310 decided to wait and let vehicle 318 pass before entering the roundabout 300, the system would continue to track oncoming vehicle 330 in the outside lane 326 and the driver in vehicle 310 would be exposed to the illuminated portion 334 of light array 304 traveling in front of vehicle 330. The driver in vehicle 310 would then make a second decision to go, or not, depending upon the safety risk posed by vehicle 330 in outside lane 326. Here, the lighted portion in front of vehicle 330 is the shortest of the illuminated portions (320 is longest; 322 is second in length; 334 is shortest) indicating that vehicle 330 is traveling slowly, and likely beneath the speed limit of roundabout 300. These different lengths of lighted portions illustrate how the lighted portions act as a scale to allow a driver to safely enter the roundabout.

FIG. 3 illustrated how it was preferable that the roundabout system for tracking vehicles would track vehicles in both the inside and outside lanes. However, vehicles in the inside and outside lanes more often than not parallel each other while driving around, until one vehicle exits the roundabout. Also, vehicles in the inside and outside lanes may pass each other. For a vehicle entering the roundabout, the system would track approaching vehicles, regardless of the lane they are in and provide the entering vehicle with reliable speed information based on the scale effect provided by the illuminated portions of the light array.

Figure 4A:
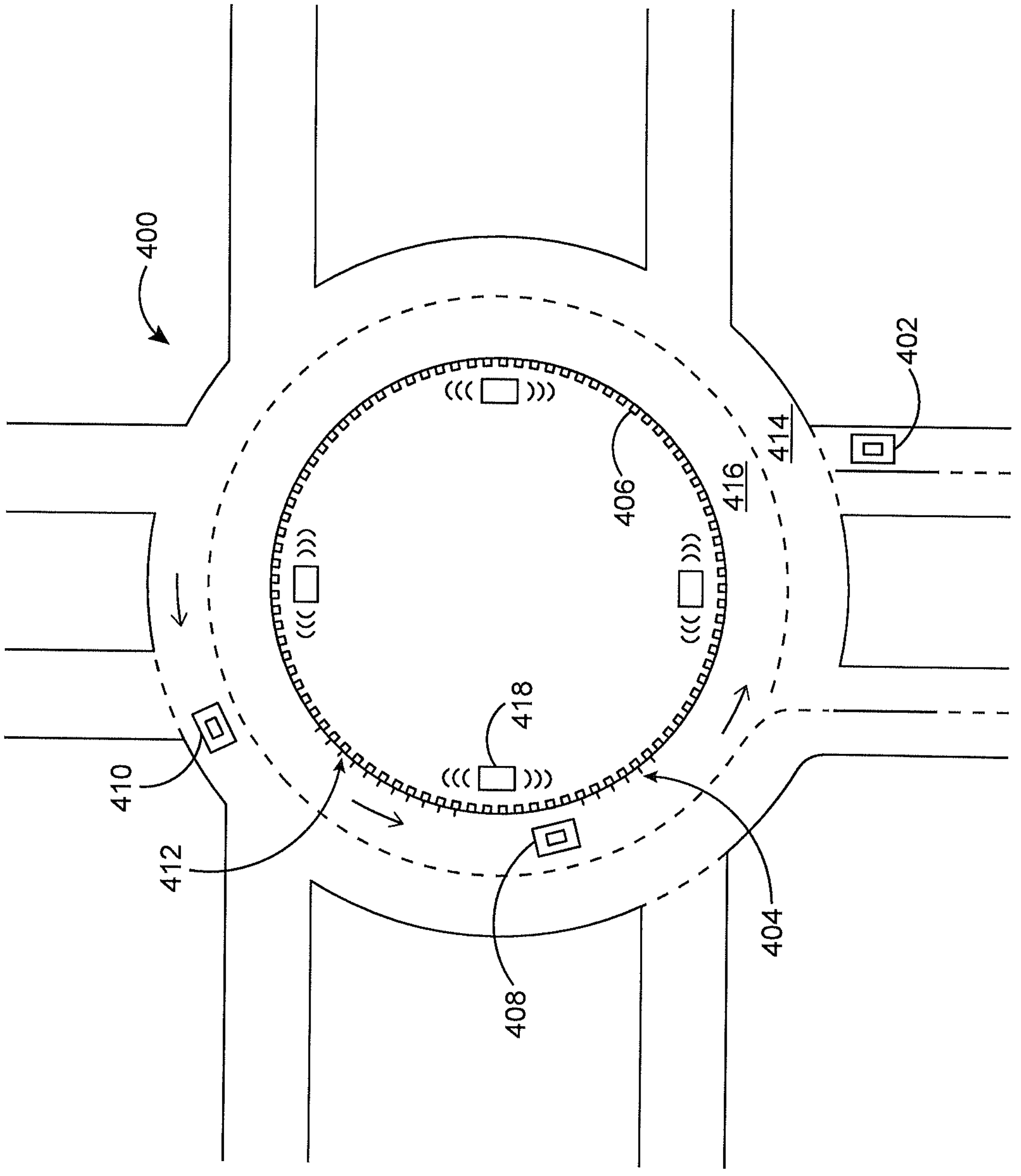
FIG. 4A is a plan view of a traffic roundabout in accordance with the invention showing the light array illuminating in a light scale format in front of two vehicles traveling at different speeds.
Figure 4B:
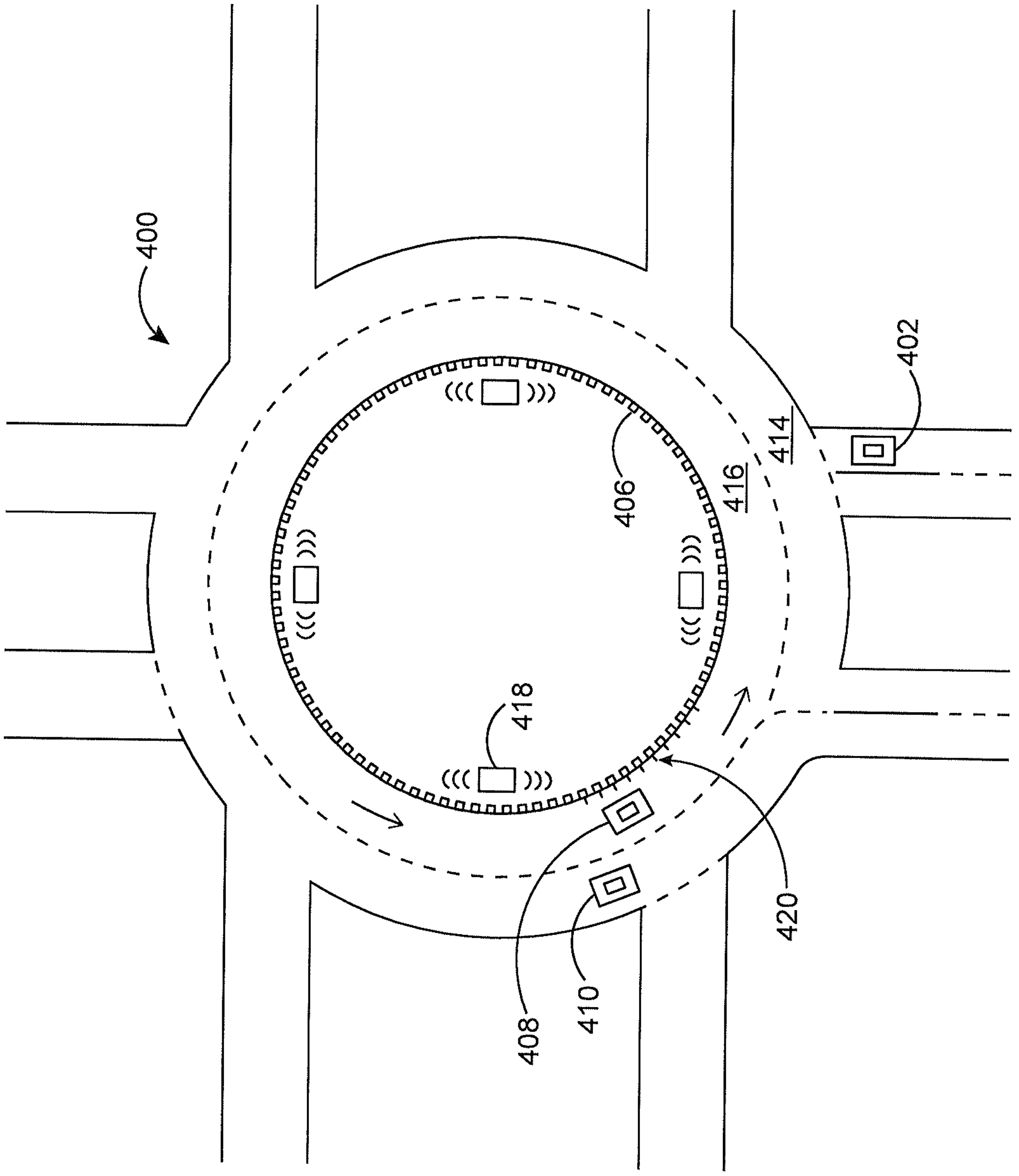
FIG. 4B is a plan view of a traffic roundabout in accordance with the invention showing the light array illuminating in a light scale format as a faster vehicle overtakes a slower vehicle.
Figure 4C:
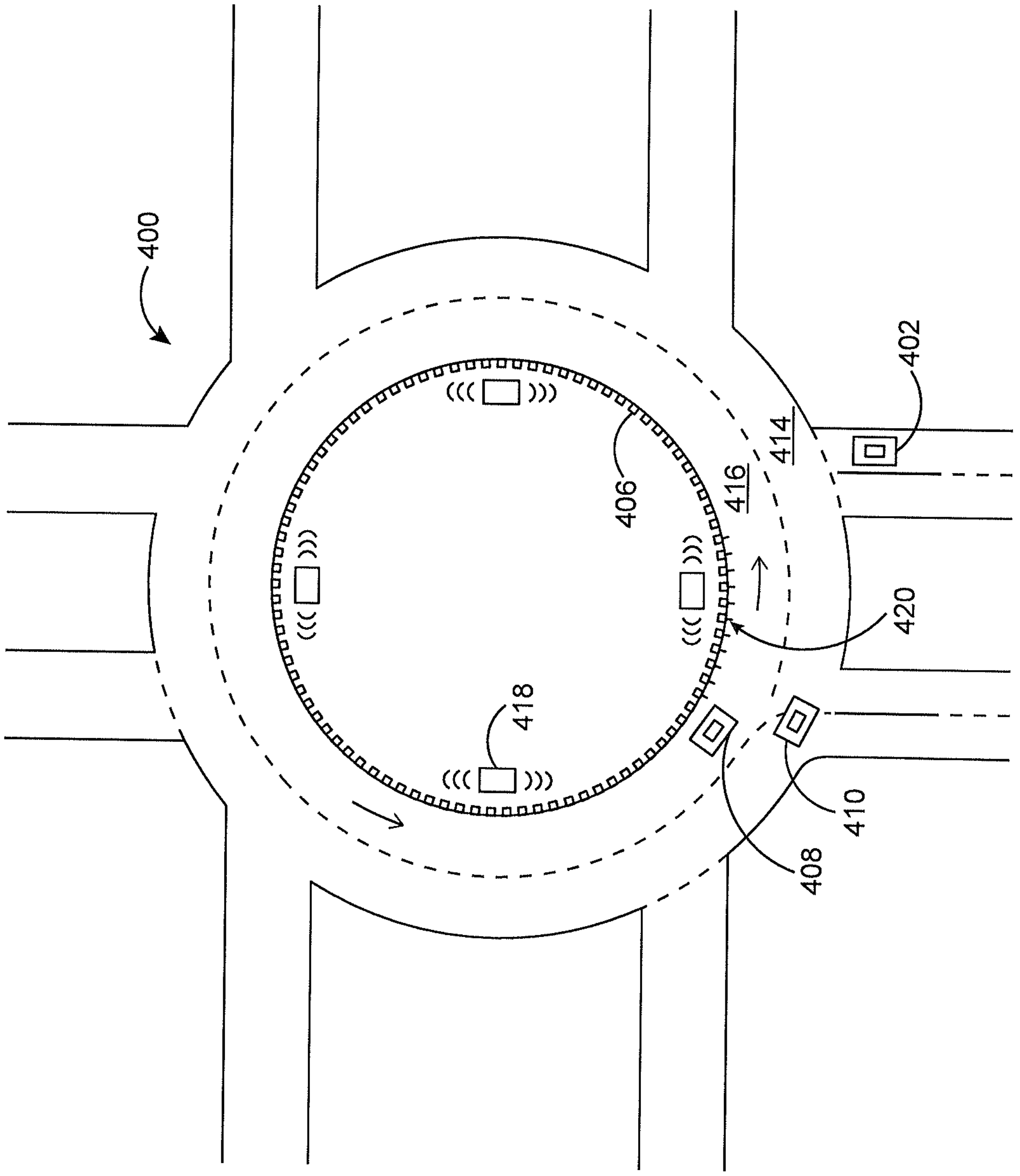
FIG. 4C is a plan view of a traffic roundabout in accordance with the invention showing the light array illuminating in a light scale format when a faster vehicle in the outside lane has passed a slower vehicle in the inside lane of the roundabout.

FIGS. 4A, 4B and 4C show a succession of views illustrating the system projecting speed information on approaching vehicles in the inside and outside lanes of the roundabout 400, the vehicles traveling at different speeds. In FIG. 4A, vehicle 402 is deciding to enter roundabout 400 and upon looking to his left, the driver of vehicle 402 sees the illuminated portion 404 of light array 406 in front of approaching vehicle 408. Illuminated portion 404 indicates that vehicle 408 is traveling at the speed limit, so it is safe for vehicle 402 to enter the roundabout. Behind vehicle 408 is fast approaching vehicle 410, which has a longer illuminated portion 412 in front of it (when compared to vehicle 408) indicating that it is exceeding a safe speed for roundabout 400. However, elongate illuminated portion 412 has not caught up with vehicle 408 and is not yet a safety risk to vehicle 402.

In FIG. 4B, vehicle 410 in the outside lane 414 has nearly caught up with vehicle 408 in the adjacent inside lane 416. Sensors 418 have been tracking both vehicles 410, 408 and to recognize the faster approach of vehicle 410, the illuminated portion 420 in front of vehicle 408, begins to lengthen as vehicle 410 overtakes vehicle 408. The driver in vehicle 402 would see the lengthening illuminated portion 420 and recognize the increasing safety risk posed by approaching vehicle 410.

In FIG. 4C, approaching vehicles 408 and 410 are all but parallel, but given the higher speed of vehicle 410, the illuminated portion 420 has elongated to reflect only the high speed of vehicle 410, which is the vehicle that poses the most danger to vehicle 402. Therefore, the system selects to illuminate a portion of the light array reflecting the faster vehicle when the vehicles are close to or parallel with each other.

Figure 4D:
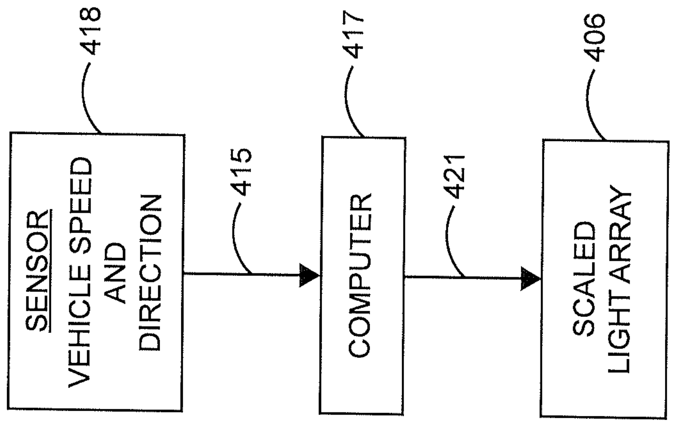
FIG. 4D is a diagrammatic view of the relationship between the sensors, the computer and the scaled light array.

FIG. 4D illustrates the relationship between the vehicle speed and direction sensors 418, the computer 417, and the light array 406. The sensors 418 provide speed and direction input data 415 to the computer 417, at which point the computer decides how large a portion of light array 406 to illuminate and sends a signal 421 to light array 406 to provide a visual scale to a driver entering the roundabout with his vehicle.

The light array described in the various views herein could also be used to signal a variety of conditions present in the roundabout. For example, if a vehicle breaks down or stops while in the inside or outside lanes of the roundabout, the sensors could detect the stopped vehicle and prompt the computer to place the light array into flashing mode around the stationary vehicle, warning approaching drivers of the emergency condition. Additionally, the light array could illuminate in different colors for different conditions. During normal illumination for a vehicle traveling at a safe speed, the moving light array could illuminate a yellow "caution" color to a driver attempting to enter the roundabout. For a vehicle traveling at excessive speed, the light array could illuminate red (in addition to being elongate) as an extra warning to the driver attempting to enter the roundabout. If a vehicle begins traveling in the wrong direction in the roundabout, the system could also use the light array to flash red in front of the wayward vehicle as a warning to the driver and approaching vehicles to avoid a collision in the roundabout. If a vehicle approaches to enter the roundabout and there are no vehicles traveling on either the inside or outside lanes of the roundabout, then the light array can illuminate green to signal that it is completely safe to enter.

Figure 5:
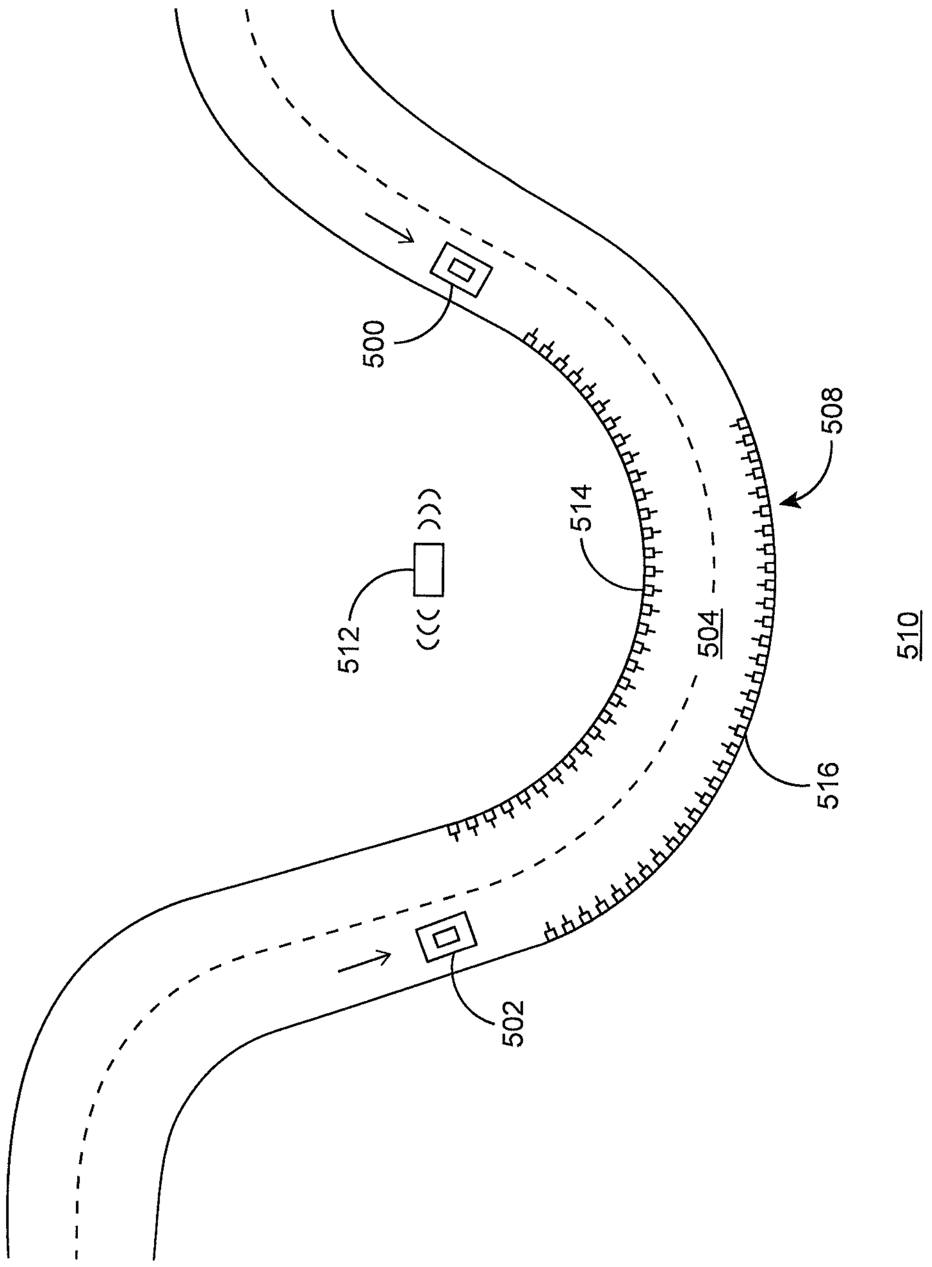
FIG. 5 is an elevated perspective view of a blind curve showing how the invention could be applied to a blind curve.

Although this invention has been described and illustrated in the context of traffic circles and traffic roundabouts, the scaling light array could be adapted to provide safety to other potentially dangerous traffic situations. In this context the scaling light array would have utility if installed on blind curves. In FIG. 5, two vehicles 500, 502 are approaching road 504 from opposite directions. A blind curve 508 sits on the edge of a cliff 510. Sensor 512 is positioned strategically on the side of road 504 to monitor traffic from both directions. Light arrays 514, 516 occupy opposite sides of road 504 along the curb. In this view the blind curve 508 prevents vehicles 500, 502 from seeing each other, but at a certain point, sensor 512 transmits a signal to a receiver in the light arrays 514, 516 to illuminate, warning the drivers in vehicles 500, 502 that they will not be alone on the blind curve 508. At that point it is up to the drivers to make any safety adjustments to their vehicles to ensure that vehicles 500, 502 do not end up making contact with each other. The light arrays 514, 516 can also scale themselves or else alter colors indicating different safety situations as described previously.

Finally, although the description above contains much specificity, this should not be construed as limiting the scope of the invention, but as merely providing illustrations of some of the presently preferred embodiments of his invention. This invention may be altered and rearranged in numerous ways by one skilled in the art without departing from the coverage of any patent claims which are supported by this specification.

I claim:

1. A traffic roundabout or circle having an inside lane and an outside lane comprising:

at least one sensor for sensing a speed of a vehicle traveling in the inside lane or outside lane of the traffic roundabout or circle;

wherein the traffic roundabout or circle further comprises a center island, the center island being bordered by a circular curb;

a light array, the light array following the circular curb;

a computer in communication with the at least one sensor to detect the speed of a vehicle traveling in the lanes of the traffic roundabout or circle;

the computer relaying the vehicle speed information to the light array, the computer instructing the light array to illuminate in scaled increments depending on the speed of a sensed vehicle;

wherein the scaled illuminated light array moves along with the sensed vehicle as the vehicle travels in the lanes of the traffic roundabout or circle.

2. The traffic roundabout or circle as recited in claim 1, wherein the illuminated light array moves in front of the sensed vehicle as the vehicle travels in the lanes of the traffic roundabout or circle.

3. The traffic roundabout or circle as recited in claim 1, wherein the at least one sensor further senses a direction of a vehicle traveling in the lanes of the traffic roundabout or circle and relays the directional information to the computer in communication with the at least one sensor.

4. The traffic roundabout or circle as recited in claim 1, wherein the at least one sensor is a radar unit.

5. The traffic roundabout or circle as recited in claim 1, wherein the at least one sensor is a LIDAR unit.

6. The traffic roundabout or circle as recited in claim 1, wherein the at least one sensor can track the speed of multiple vehicles traveling in the traffic roundabout or circle wherein the at least one sensor relays the speed of multiple vehicles to the computer, the computer in turn displaying the speeds of multiple vehicles as scaled increments upon the light array corresponding to each vehicle.

7. A traffic roundabout or circle having at least one vehicle lane, comprising:

at least one sensor for sensing a speed of a vehicle traveling in the at least one vehicle lane of the traffic roundabout or circle;

a computer in communication with the at least one sensor to detect the speed of the vehicle traveling in the at least one vehicle lane of the traffic roundabout or circle;

a light array, the light array being capable of illuminating in scaled increments;

the computer relaying vehicle speed information to the light array, the computer instructing the light array to illuminate in scaled increments depending on the speed of a sensed vehicle;

wherein the light array illuminated in scaled increments moves along with the sensed vehicle as the vehicle travels in the at least one lane of the traffic roundabout or circle.

8. The traffic roundabout or circle as recited in claim 7, wherein the at least one sensor is a radar unit.

9. The traffic roundabout or circle as recited in claim 7, wherein the at least one sensor is a LIDAR unit.

10. The traffic roundabout or circle as recited in claim 7, wherein the at least one sensor can track the speed of separate vehicles traveling in the traffic roundabout or circle, the at least one sensor relaying the speed of separate vehicles to the computer, the computer in turn displaying the speeds of separate vehicles as scaled increments upon the light array corresponding to each separate vehicle.

* * * * *